United States Patent [19]

Sarfati

[11] Patent Number: 4,602,258
[45] Date of Patent: Jul. 22, 1986

[54] PROCESS FOR REMOVING DISTANCE MEASUREMENT AMBIGUITY AND A RADAR USING THIS PROCESS

[75] Inventor: Pierre Sarfati, Paris, France
[73] Assignee: Thomson CSF, Paris, France
[21] Appl. No.: 423,314
[22] Filed: Sep. 24, 1982

[30] Foreign Application Priority Data

Mar. 12, 1982 [FR] France ................ 82 04223

[51] Int. Cl.$^4$ .................. G01S 13/46; G01S 7/28
[52] U.S. Cl. .................... 343/13 R; 343/17.1 R
[58] Field of Search ............ 343/17.1 PF, 13 R, 14, 343/17.2 R, 17 R; 364/458

[56] References Cited

U.S. PATENT DOCUMENTS

| | | | |
|---|---|---|---|
| 3,163,862 | 12/1964 | Jenny | 343/17.2 R |
| 4,143,373 | 3/1979 | Chernick | 343/17.1 PF |
| 4,197,540 | 8/1980 | Riggs et al. | 343/17.2 R |
| 4,214,240 | 7/1980 | Weiss | 343/7 PF |
| 4,496,949 | 1/1985 | Bettini et al. | 343/17.2 R |

FOREIGN PATENT DOCUMENTS 2412852  7/1979  France .

OTHER PUBLICATIONS

Technical Notes, TN No. 900, 20 Dec. 1971, RCA, Princeton (US), H. Urkowitz: "Block Frequency Diversity Radar Technique", pp. 1-7.

Primary Examiner—T. H. Tubbesing
Assistant Examiner—Gilberto Barrón, Jr.
Attorney, Agent, or Firm—Cushman, Darby & Cushman

[57] ABSTRACT

Radar apparatus and method for eliminating ambiguity in radar range measurements. The radar emits bursts of n pulses and the emission frequency is changed at each new burst. The number M of pulses received after reflection from a target is counted. If N is the number of pulses emitted when a target is within the scanning space of the radar, the number M is compared with numbers N, N(n-1)/n, ... N(n-i)/n, ..., N/n. The result of the comparison is used for classifying the echoes received in their respective recurrence up to the n$^{th}$ recurrence. The echoes can be readily identified since the emission frequencies of adjacent bursts are different. Thus, the useful range of the radar is increased without increasing the recurrence period of the pulses emitted.

14 Claims, 2 Drawing Figures

PROCESS FOR REMOVING DISTANCE MEASUREMENT AMBIGUITY AND A RADAR USING THIS PROCESS

BACKGROUND OF THE INVENTION

The present invention relates to distance detection and measurement systems using a radar.

In these systems, the radar periodically emits, for short intervals of time, an electromagnetic wave at an emission frequency situated in an ultra high frequency band. The pulses thus emitted are propagated in the atmosphere, are possibly reflected by a target and are again received by the radar after a length of time which depends on the distance of the radar from the target. The measurement of this time gives a precise indication about the distance of the radar from the target. Moreover, for Doppler radars, the shift between the frequency of the electromagnetic wave of the emitted pulse and the frequency of the electromagnetic wave of the pulse received after reflection from the target gives an indication of the component of the travelling speed of the target relative to the radar.

The pulses are emitted periodically with a recurrence frequency $F_r$ (period $T_r$). For an observation radar whose antenna rotates while scanning the space to be observed, a piece of data to be taken into consideration is the number N of direct "shots", that is to say the number N of pulses emitted and capable of being reflected by a target before the target leaves the field of the radar because of the rotation thereof. The number N depends on the directivity of the antenna and on the recurrence frequency of the pulses, but it forms a parameter which may be well known for a given system.

If a target sufficiently distant from the radar receives a pulse, the echo reflected can only be received by the antenna of the radar after a second pulse has been emitted, separated from the first one by the recurrence period $T_r$. In this case, the radar system does not know a priori if the echo received comes from the second pulse reflected by a near-by target or from the first pulse reflected by a much more distant target.

More generally, if a target is at a distance less than $cT_r/2$ (c being the speed of propagation of the electromagnetic waves emitted), the radar will receive an echo from a pulse during the recurrence period $T_r$ which immediately follows emission of that pulse; it will be said to be a first recurrence or first trace echo.

If the target is at a distance between $cT_r/2$ and $cT_r$, the radar will receive an echo during the second recurrence period following emission of the pulse; it will be a second recurrence or second trace echo.

If the target is at a distance between $(n-1)cT_r/2$ and $ncT_r/2$, the radar will receive an echo during the $n^{th}$ period following emission of the pulse; it will be an $n^{th}$ trace echo, the target being also called $n^{th}$ trace target.

The pulses are regularly emitted by the radar and it (or PRF) is necessary to know with certainty if an echo received is a reflection of the immediately preceding pulse or not. In order to eliminate ambiguities, different means have then already been proposed for eliminating the echoes which are not first trace echoes.

For example, a variation of the recurrence period from pulse to pulse causes the first trace echoes from a target at a given distance to remain fixed with respect to the pulses which immediately precede them, whereas the other echoes move. The unstable echoes can then be eliminated and only the stable echoes corresponding to first trace targets are kept.

An aim of the present invention is to allow not only first trace echoes to be distinguished from other echoes but also echoes corresponding specifically to the second, third trace, etc... to be identified and these echoes to be classified instead of eliminating them so as to determine the exact distance of the targets up to a distance equal to several times the ambiguity distance $cT_r/2$ of the radar.

Solutions which come naturally to mind for increasing the range as far as possible while still being able to unambiguously determine the distance of targets is would be to multiply by 2, 3, 4 etc... the recurrence period or to modulate it in accordance with the principle outlined in the preceding paragraph so as to eliminate echoes other than first trace echoes. But, the first solution reduces the probability of detecting a target whereas the second is ill-adapted to a Doppler radar and is difficult to use.

SUMMARY OF THE INVENTION

The present invention proposes a process for removing distance measurement ambiguity which allows, while keeping a given recurrence period which fixes the ambiguity distance, echoes to be eliminated if they are beyond the $n^{th}$ trace, but echoes up to the $n^{th}$ trace to be kept and classified in their respective trace so as to deduce the exact distance of the target which causes these echoes.

The process of the invention consists in emitting the pulses in bursts of n pulses, n being an integer equal to a few units, in changing the emission frequency of the radar (frequency of the ultra high frequency wave) from one burst to the next, the emission frequency remaining constant for all the pulses of a burst, and in counting the number M of pulses received after reflection from a target and, knowing the number N of direct "shots" emitted by the radar, in comparing the number M of pulses received essentially with the numbers N, $N(n-1)/n$, $N(n-2)/n$ ... $N/n$.

The result of the comparison is then transmitted or displayed to define the range of distances of the target in the following way: if M is between $N(n-i+1)/n$ and $N(n-i)/n$, the echoes received are classed as $i^{th}$ recurrence echoes and the target is considered as being at a distance between $(i-1)cT_r/2$ and $icT_r/2$ where c is the speed of propagation of the waves and $T_r$ the recurrence period of the pulses within a burst of n pulses.

The recurrence frequency does not need to be modulated, neither from pulse to pulse, nor from burst to burst, nor from anenna tower to antenna tower.

The invention can be explained in the following way: if a burst comprises at the same emission freqency F1, then n other pulses at another emission frequency F2, we can look to see which are the pulses of frequency F1 received after reflection during the first period of time $nT_r$ corresponding to the first burst.

It the target is a first trace target, an echo at frequency F1 will be detected after each pulse emitted at frequency F1; n echoes will then be detected. No echo is then detected during the second burst for the local oscillator of the radar has gone over to frequency F2 and the echoes at frequency F1 are no longer detected (it is not a Doppler radar).

If the target is a second trace target, there will be no echoes after the first pulse at F1, then an echo will follow each pulse at frequency F1 until the frequency of the local oscillator changes to F2. Accordingly, n-1 pulses will be received.

If the target is the $i^{th}$ trace target, n-i+1 pulses will be received.

If the target is beyond the $n^{th}$ trace, no pulse will be received.

In practice, it is not the number of pulses per burst which will be counted in accordance with the invention, but the total number of pulses received while the target is in the field of the radar.

If the radar emits N direct "shots", the number of bursts of n pulses emitted while the target is in the field of the radar is N/n.

Consequently, if the target is the $i^{th}$ trace target, the number of pulses received from a target is theoretically N(n-i+1)/n (i varying from 1 to n) and it is zero for i greater than n.

The number M of pulses received will be counted and compared with the numbers N(n-i+1)/n. Since the probability of detection is not always equal to 100%, a signal will be transmitted or displayed indicating that the target is an $i^{th}$ trace target if the number M of pulses received is between N(n-i+1)/n and N(n-i)/n.

For the $n^{th}$ trace (i=n), an $n^{th}$ trace target detection signal will be transmitted if M is between N/n and a number p smaller than N/n, p representing a safety margin corresponding to a false alarm rate which may be possibly adjustable. If M is less than p, no target detection signal will be transmitted.

A simple numerical example may be given: if N=120 and if it is desired to eliminate the targets beyond the fourth trace (n=4), the emission frequency will be changed every four pulses and the number M of pulses received will be counted; if M is between 91 and 120 a signal will then be transmitted indicating that the echoes received are first trace echoes; if M is between 61 and 90, it will be a second trace; if M is between 31 and 60, a third trace and if M is between p and 30 a fourth trace. The pulses in number less than p will not be taken into account for defining the presence of a target.

The emission sequencing, consisting of emitting a burst of n pulses at frequency F1 and changing the emission frequency for each new burst, may be achieved in several ways. The simplest way would consist in alternating bursts at frequency F1 and bursts at frequency F2. A cycle of bursts may also be provided with more than two frequencies, for example four or more.

The higher the number of frequencies cyclically used, the less is the risk that high trace targets are taken into account and confused with lower trace targets: for example if only two frequencies F1 and F2 are alternated in bursts of three pulses, the fourth trace echoes will not be eliminated and will be practically equal in number to the third trace echoes.

The recurrence frequency may however also be changed, which has the further advantage of allowing several different trace targets to be distinguished whose echoes would be superimposed with a fixed recurrence frequency.

The ambiguity removal process which has just been described, with emission at several successive frequencies, in bursts, then counting the number of echoes received and comparison with known numbers, proves to be particularly efficient in the case of the surface path of sea observation radars, but it is more generally applicable to any measurement radar (non Doppler).

It is all the more efficient the greater the equivalent target areas, which is particularly true in the case of observation radars charged with detecting surface ships.

DESCRIPTION OF THE PREFERRED EMBODIMENT

Figure 1:
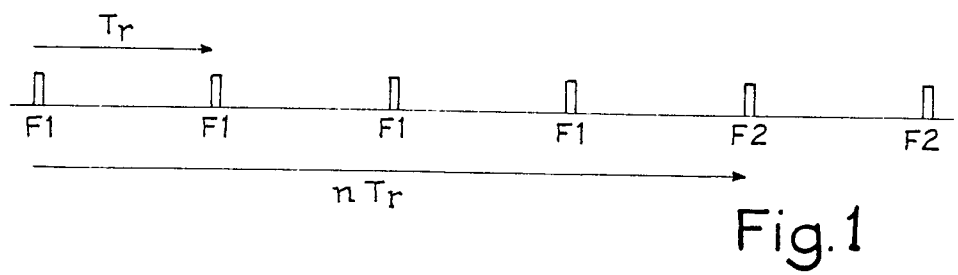
FIG. 1 shows the succession of pulses emitted, with their respective emission frequencies, for eliminating echoes beyond the fourth trace (n=4). Each burst comprises four pulses at the same emission frequency. The radar will comprise a frequency change control, driven by a clock of period nTr for ensuring this change every n recurrence periods.

Conventionally, the video signal received by the radar is sampled so as to break down the recurrence period Tr of the radar into a number of small time intervals called "distance slots" or "range bins"; if an echo appears in a given distance slot, there is direct correspondence between the number of this distance slot in the recurrence period and the distance from the target to the radar. There is very often used as a sampling period, so as to determine the duration to be allocated to each distance slot, the width of the pulse emitted by the radar at the beginning of each recurrence period.

The video signal from the radar antenna is applied, after sampling and demodulation, to the input E of a threshold comparator 10. This threshold may be fixed or slaved to the average noise level of the receiver; it allows the false alarm rate to be adjusted.

An echo is detected only if there is overshooting of the threshold, in which case comparator 10 supplies a high level logic signal, the level being, on the contrary, low in the absence of threshold overshoot.

The logic signals from the comparator are fed to the input of shift register 12 having at least as many compartments as there are distance slots in a recurrence period Tr. The shift is controlled periodically by a clock signal H1 whose period is the sampling period of the video signal. Signal H1 is supplied by a logic circuit 14 supplying different periodic signals for controlling the distance ambiguity removal circuit as well as the whole of the radar.

Thus, from the beginning of a recurrence period, logic signals indicating the presence or absence of an echo are successively fed into the shift register 12 which, at the end of a recurrence period Tr, is filled with 0's or 1's indicating the absence or the presence of targets at distances corresponding to the different distance slots.

To eliminate the distance ambiguity, as was explained above, the number of echoes received from a target are counted while the radar emits N direct shots. For a given target, it will of course be a question of counting the number of echoes received at the same position, so in a given distance slot, if an echo is received in the $j^{th}$ distance slot, it will be necessary, in order to remove the distance ambiguity in accordance with the process of the invention, to count the number of echoes received (during the N emissions of the radar) in the $j^{th}$ distance slot. The cumulation of the threshold overshoots during the successive recurrences will have to be made in each distance slot.

A summer 16 is inserted between the output of comparator 10 and the input of register 12. This summer receives therefore, on the one hand, the output of comparator 10 and, on the other hand, through an AND gate 18 which may be inhibited for one Tr period every N Tr periods, the output of register 12.

Thus, there is fed into the register, during recurrence k, the sum of the signal received (threshold overshoot or not) in distance slot j and signals previously received in the same slot.

Of course, the register will have to be capable of storing in each compartment a number of several bits; it may be a question of several registers in parallel driven in synchronism by signal H1.

After cumulation over N successive recurrences, register 12 will comprise, for each distance slot, a number representing the number of threshold overshoots during these N recurrences.

After these N recurrences, the cumulation is stopped for a recurrence period; a signal H2, from logic circuit 14 and comprising a square wave of duration (N-1)Tr which is renewed periodically with a period NTr, disables the AND gate 18 for the first Tr period of a series of N and enables it again for the following N-1 periods. For the first period, the register is therefore filled again without cumulation whereas the previously cumulated numbers are fed from the register to a processing unit for removing the distance ambiguity and reclassing the echoes in their respective recurrence.

The transmission of these cumulated numbers takes place by enabling, by means of the complement of signal H2 during the first Tr period, an AND gate 20 connected in the output of the register.

Of course, there is shown in the drawing a two input AND gate but, since it is a question of transmitting for each distance slot a number of several bits, the AND gate 20 is in actual fact formed by an assembly of AND gates simultaneously enabled by the complement of signal H2 and each gate letting through a bit of the number to be transmitted.

The cumulated numbers transmitted successively, distance slot by distance slot, in synchronism with sampling of the video signal, are compared in parallel in several double comparators whose function is to compare the number received with numbers N(n-i)/n, where n is the rank of the recurrence beyond which it is desired to eliminate the echoes. It will be recalled that the radar changes emission frequency every n pulses and this is way an output of logic circuit 14 has been provided for supplying a period signal nTr for controlling the radar emission frequency change. This signal may serve for sequentially addressing a programmable read only memory 22 (PROM) capable of transmitting different radar frequency values F1, F2 etc . . . to the emission circuit of the radar (not shown).

Figure 2:
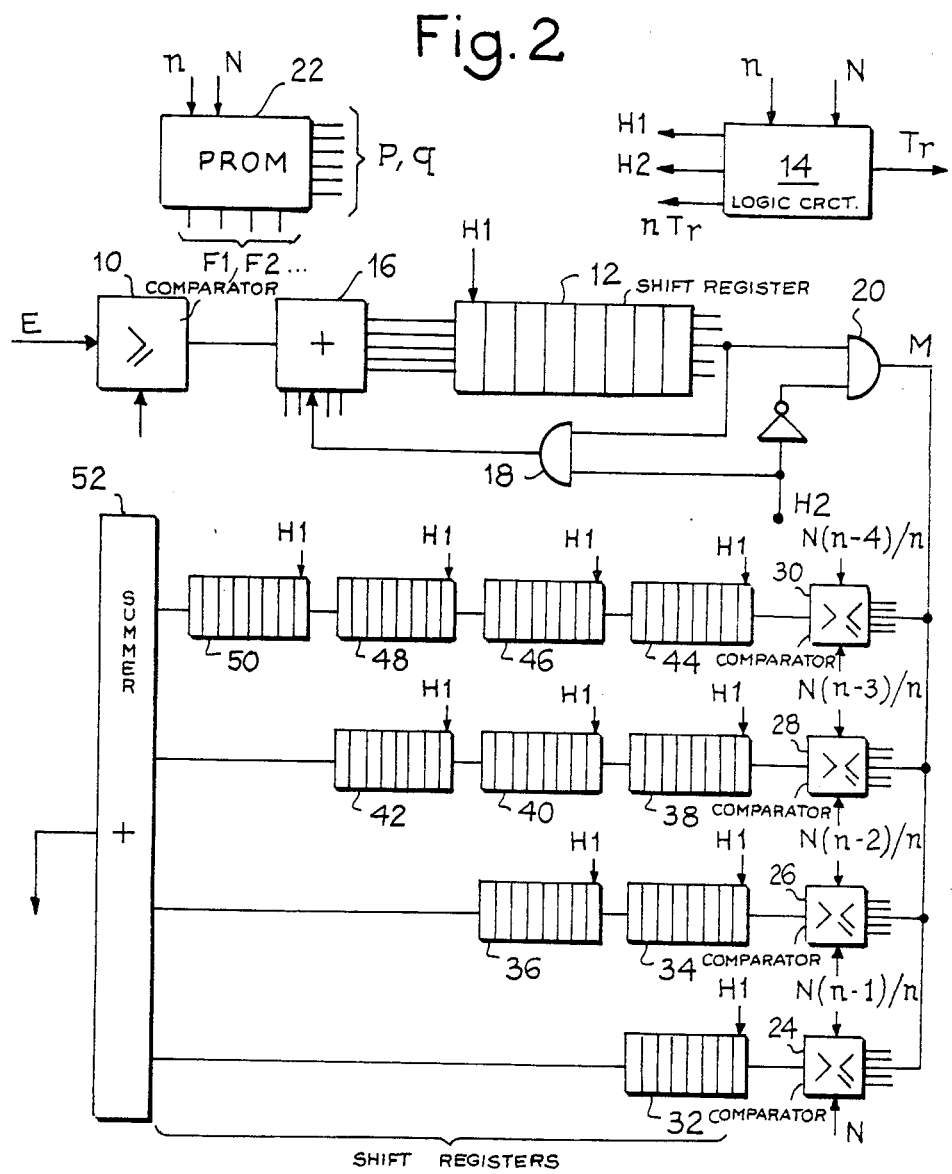
FIG. 2 shows a non limiting example of a system for removing distance ambiguity allowing the echoes to be reclassed in their respective recurrence by the process of the invention.

The ROM 22, preferably programmable, also contains the values of the numbers N(n-i)/n designated generally by the letters p, q in FIG. 2. Depending on the numbers n and N serving for addressing the ROM, numbers p, q are supplied at the output thereof and fed to double comparators which receive the numbers of cumulated echoes to be compared with numbers N(n-i)/n.

In the example shown, four double comparators have been provided for comparing the number M of echoes received and cumulated in a distance slot respectively with numbers N and N(n-1)/n for a comparator 24
N(n-1)/n and N(n-2)/n for a comparator 26
N(n-2)/n and N(n-3)/n for a comparator 28
N(n-3)/n and N(n-4)/n for a comparator 30.

There may be as many double comparators as recurrences in which it is desired to obtain echoes.

The last comparator may in fact compare the number received with a number which is not zero but which may be a number p chosen depending on a false alarm rate adjustment which must be taken into account.

Thus, at the output of the comparators, at a given sampling time, and for a given distance slot, a signal is to be found indicating in which bracket N(n-i+1)/n, N(n-i)/n the number of echoes received is to be found. The comparator corresponding to this bracket delivers a particular signal and the presence of this signal at the output of the comparator of rank i is characteristic of the presence of an $i^{th}$ recurrence echo.

It is further provided for the echoes thus detected to be reclassified one after another in their respective recurrence before retransmitting them to a user device (computer or panoramic indicator). Thus, an $i^{th}$ trace echo present in a given distance slot will appear with a delay of (i-1)Tr with respect to a first trace echo which might be present in the same distance slot.

For that, the signals indicating the presence of an echo are delayed differently depending on the comparator from which they come. Shift registers may serve for providing this delay while storing the echo presence signals over the duration of a recurrence.

These registers are driven in synchronism by the clock signal H1. They have the same number of compartments as register 12.

Thus, for first trace echoes, a shift register 32 is placed at the output of comparator 24. All the first recurrence echoes received after N direct shots emitted by the radar are to be found there.

At the output of comparator 26 there are placed, in cascade, two shift registers 34 and 36, the second one playing the role of delay line introducing a delay Tr; the second trace echoes are to be found here but they only arrive after transmission of the echoes present in register 32.

Similarly, third trace echoes pass through three registers 38, 40, 42 in series after comparator 28 and fourth trace echoes pass through four registers 44, 46, 48, 50 at the output of comparator 30.

The outputs of registers 32, 36, 42, and 50 are connected to a summer 52 which transmits them to a computer or panoramic indicator which processes them.

When it is desired to limit the number of recurrences in which echoes are sought, the unused comparators and shift registers must be inhibited. This inhibition may be achieved under the control of the PROM 22 in which an operator indicates the number n of recurrences of interest.

The preceding description is not limitative and there may be further provided a method and apparatus for the computing and number comparison functions, as well as reclassifying of the echoes in the respective recurrences. Such an apparatus may, for example, include a programmed computer or micro-computer.

If the recurrence period is changed during rotation of the antenna, the number of distance slots may be maintained or changed, but the shift registers must comprise at least as many compartments as the maximum number of distance slots which there are likely to be.

What is claimed is:

1. A method of removing ambiguity in measurements of distance from a radar to a target, where the target is in the detection space of said radar for a given period of time, comprising the steps of:

emitting a plurality of bursts toward said target, each burst including n pulses with a recurrence period Tr between successive pulses, each pulse having an emission frequency which is common to all pulses in a burst, a total of N pulses being emitted while said target is in said detection space;

changing the emission frequency of said pulses from burst to burst;

receiving pulses reflected from said target, the pulses from each burst being identifiable by their emission frequencies;

counting a total number of received pulses M;

comparing said number M with a predetermined succession of numbers N(n-i)/n, where i is a predetermined successive series of integers; and determining two successive numbers N(n-i+1)/n and N(n-i)/n from said predetermined succession of numbers which said number M falls between, whereby the unambiguous distance to the target is between (i−1)cTr/2 and icTr/2, where c is the speed of electromagnetic propagation.

2. A method according to claim 1 further including the step of transmitting said unambiguous distance to a display device.

3. A method according to claim 1 wherein said determining step is not performed if said number M is smaller than a predetermined threshold value p.

4. A method according to claim 3 wherein p is smaller than N/n.

5. Apparatus for removing ambiguity in measurement of distance from a radar to a target, where the target is in the detection space of said radar for a given period of time, comprising the steps of:

means for emitting a plurality of bursts toward said target, each burst including n pulses with a recurrence period Tr between successive pulses, each pulse having an emission frequency which is common to all pulses in a burst, a total of N pulses being emitted while said target is in said detection space;

means for changing the emission frequency of said pulses from burst to burst;

means for receiving pulses reflected from said target, the pulses from each burst being identifiable by their emission frequencies;

means for counting a total number of received pulses M;

means for (a) comparing said number M with a predetermined succession of numbers N(n-i)/n, where i is a predetermined successive series of integers, and (b) determining two successive numbers N(n+i)/n and N(n-i)/n from said predetermined succession of numbers which said number M falls between, whereby the unambiguous distance to the target is between (i-1)cTr/2 and icTr/2, where c is the speed of electromagnetic propagation.

6. Apparatus according to claim 5 further including means adapted for transmitting said unambiguous distance to a display device.

7. Apparatus according to claim 5 wherein said determining means is inhibited if said number M is smaller than a predetermined threshold value p.

8. Apparatus according to claim 7 wherein p is smaller than N/n.

9. Apparatus according to claim 5 wherein said counting means includes a first shift register having a number of compartments equal to a predetermined number of range bins in a single recurrence period, said first shift register having an output and being driven at a sampling frequency corresponding to the number of range bins divided by the recurrence period.

10. Apparatus according to claim 9 further including summer means, connected to said first shift register, for adding said first shift register output to received pulses which are received in corresponding range bins of successive recurrence periods, and wherein said first shift register is unloaded at the end of N recurrence periods for comparison to said predetermined numbers.

11. Apparatus according to claim 10 wherein said comparing and determining means includes a plurality of comparators coupled to said first shift register, and a plurality of second shift registers coupled to said plurality of comparators.

12. Apparatus according to claim 11 further including a summer adapted for transmitting said unambiguous distance to a display device.

13. Apparatus according to claim 11 wherein said plurality of comparators includes first through a maximum value of i comparators, and wherein said plurality of second shift registers includes first through said maximum value of i double shift registers coupled to said comparators, respectively.

14. Apparatus according to claim 13 wherein each said double shift register includes a number of compartments equal to the number of said first shift register compartments.

* * * * *